UNITED STATES PATENT OFFICE.

BERTHOLD KÜETTNER, OF LONDON, ENGLAND.

METHOD OF MAKING SECONDARY-BATTERY PLATES.

SPECIFICATION forming part of Letters Patent No. 681,329, dated August 27, 1901.

Application filed October 25, 1900. Serial No. 34,367. (No specimens.)

*To all whom it may concern:*

Be it known that I, BERTHOLD KÜETTNER, electrical engineer, of 20 Alfred Place, Bedford Square, London, W. C., England, a subject of the Emperor of Germany, have invented certain new and useful Improvements in the Manufacture of Secondary-Battery Plates, of which the following is a specification.

This invention relates to improvements in the manufacture of secondary-battery plates, the object of which is to render such plates stronger, lighter, and more durable and to increase their efficiency.

My invention relates especially to the paste or active material employed in such plates, and in the preparation of this active material I employ finely-divided oxids of lead, preferably litharge, to which finely-divided lead may be added, mixed with a solution of a soluble silicate or silicates, such as sodium or potassium silicate, to form a paste or plastic compound. This paste after application to a lead conducting sheet is placed under slight pressure and is then dipped into a very dilute ammonium solution, preferably ammonium sulfate. The plate is dipped into this hardening solution before it has dried or set and is left in the solution a considerable time, say from twenty-four to forty-eight hours. Chemical reaction is set up and the solution becomes strongly alkaline through dissolved ammonia. The chemical changes may roughly be represented as follows in the case of an ammonium-sulfate solution:

$$PbO + (NH_4)_2SO_4 = PbSO_4 + 2NH_3 + H_2O.$$

The lead in the plate exists for the most part in the form of a mixture of sulfate and oxids.

When the plate is removed from this solution, it is placed in a second solution, preferably of the same nature, but more concentrated, and is left in this until the hardening process is complete. In the process described the soluble silicate is washed out of the plate and the lead compound resulting from the treatment is hard, porous, and coherent, the degree of hardening and porosity being entirely a matter of manipulation. The action of the hardening solution upon the uncombined silicate contained in the plate cannot be adequately represented in any simple formula. A chemical action takes place, however, which results in the free silicate being dissolved in the solution very slowly and small quantities of a gelatinous substance result, which sink to the bottom of the vat in which the plates are placed. This material may be spoken of as "gelatinous silica," and the material is formed very slowly and in small flakes only until the silicate is practically entirely removed. The action may be represented very roughly by the following formula:

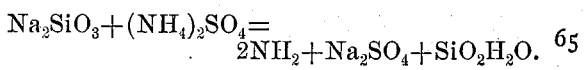
$$Na_2SiO_3 + (NH_4)_2SO_4 = 2NH_3 + Na_2SO_4 + SiO_2H_2O.$$

The chemical action thus indicated is not, however, necessarily completed in the plate, and various hydrated compounds of silica may be formed in the solution as the sodium silicate dissolves out. The hydrated silica indicated in the formula must be taken as merely representative of several hydrated silicas. Any silica which remains in the plate after the process is in combination with the lead or lead compounds.

The contact between the lead grid and the active material is very close, as the surface of the lead conducting sheet is slightly acted upon by the paste, so that there is a distinct union between the two, giving the best possible electrical contact. This action is due to the lead sulfate formed in the plate as above described, the surface of the lead conducting sheet being also slightly sulfated. The plate so prepared can be reduced to porous lead to form the positive plate of a secondary battery or may be directly formed in the usual manner into lead peroxid without requiring any prior reduction to pure lead. It is also found that forming takes place from the grid outward and not from the surface of the active material, and it may thus be at once seen when the plate is formed throughout.

The reducing and forming of the plates may be effected in the usual manner; but I find it advantageous to reduce the positive plate in a solution of ammonium sulfate and to oxidize the negative plate in dilute sulfuric acid, or both plates may be treated simultaneously in a slightly-acid solution of sulfuric acid and ammonium sulfate.

Plates having the active material prepared in the manner described show very slight expansion and contraction during charge and discharge, and the stresses commonly set up in secondary-battery cells are thus reduced. The exact amount of expansion can be regulated in manufacture by varying the mixture of oxids employed, which all form a setting-paste with the soluble silicate. In the preparation of the paste for these plates the lead employed may vary from pure finely-divided lead to lead peroxid, or any mixture of the oxids may be used according to the circumstances. If pure lead is employed, the negative plate expands to the largest possible extent in conversion to $PbO_2$. This expansion decreases with the addition of oxids until the minimum of expansion is reached, when $PbO_2$ itself is employed in making the paste. In all cases a hard and coherent plate is obtained by the treatment above described, and a grid in the sense of a support for the plate is not necessary. All that is required in order to provide for a rapid discharge of the cell is a lead conducting sheet.

What I claim as my invention, and desire to secure by Letters Patent, is—

1. In a method of making secondary-battery plates, mixing lead oxids with a solution of a soluble silicate to form a paste, making the paste into a plate and dipping the plate in a dilute solution of an ammonium salt, substantially as herein described.

2. A method of making secondary-battery plates, consisting in mixing lead oxids with a solution of a soluble silicate to form a paste, making the said paste into the form of a plate, dipping the plate into a dilute solution of an ammonium salt, removing it and placing it in a second solution of greater strength and afterward forming the plate, substantially as herein described.

In witness whereof I have set my hand in the presence of two witnesses.

BERTHOLD KÜETTNER.

In presence of—
FRANK WILLIAM PATTISON,
WILLIAM JAMES COX.